(12) United States Patent
Farrar et al.

(10) Patent No.: US 12,240,974 B2
(45) Date of Patent: Mar. 4, 2025

(54) METHOD OF MAKING THERMOPLASTIC POLYOLEFIN

(71) Applicant: CpK Interior Products Inc., Port Hope (CA)

(72) Inventors: Gregory James Farrar, Roblin (CA); Murali Mohan Reddy, Belleville (CA)

(73) Assignee: CpK Interior Products Inc., Port Hope (CA)

( * ) Notice: Subject to any disclaimer, the term of this patent is extended or adjusted under 35 U.S.C. 154(b) by 0 days.

(21) Appl. No.: 18/371,638

(22) Filed: Sep. 22, 2023

(65) Prior Publication Data

US 2024/0010830 A1  Jan. 11, 2024

Related U.S. Application Data

(62) Division of application No. 17/082,706, filed on Oct. 28, 2020, now Pat. No. 11,807,753.

(51) Int. Cl.
*C08L 53/00* (2006.01)

(52) U.S. Cl.
CPC ......... *C08L 53/00* (2013.01); *C08L 2205/025* (2013.01); *C08L 2205/03* (2013.01)

(58) Field of Classification Search
CPC . C08L 53/00; C08L 2205/025; C08L 2205/03
See application file for complete search history.

(56) References Cited

U.S. PATENT DOCUMENTS

| | | | |
|---|---|---|---|
| 5,948,850 A | 9/1999 | Enami et al. | |
| 6,207,754 B1 * | 3/2001 | Yu | C08L 23/10 525/196 |
| 6,451,887 B1 | 9/2002 | Wood et al. | |
| 6,812,285 B2 | 11/2004 | Enami et al. | |
| 8,674,027 B2 | 3/2014 | Krabbenborg | |
| 8,852,689 B2 | 10/2014 | Srinivas et al. | |
| 9,752,024 B2 | 9/2017 | Barry et al. | |
| 11,807,753 B2 | 11/2023 | Reddy et al. | |
| 2008/0315566 A1 * | 12/2008 | Andrasik, III | B60R 21/2165 280/728.3 |

(Continued)

FOREIGN PATENT DOCUMENTS

| | | |
|---|---|---|
| CN | 10303088 A | 4/2013 |
| CN | 104558845 | 4/2015 |

(Continued)

OTHER PUBLICATIONS

English-language machine translation of JP 2001-226542A (Year: 2001).*

(Continued)

*Primary Examiner* — James C Goloboy
(74) *Attorney, Agent, or Firm* — Harness Dickey & Pierce PLC (57) ABSTRACT

A thermoplastic polyolefin (TPO) powder is provided. The TPO powder includes an olefin-block copolymer (OBC), polypropylene copolymer, an adhesion promoter, a sulfur-free stabilizer additive, a composition including a non-migratory hindered amine light stabilizers (HALS) and a color pigment, and talc. A TPO material formed from the TPO powder and methods of making the TPO powder and TPO material are also provided.

28 Claims, 6 Drawing Sheets

(56) References Cited

U.S. PATENT DOCUMENTS

| | | | | |
|---|---|---|---|---|
| 2010/0143651 A1* | 6/2010 | Silvis | ................. | C08L 23/0815 |
| | | | | 36/98 |
| 2010/0222471 A1* | 9/2010 | Lorenzetti | .............. | C08K 5/005 |
| | | | | 524/100 |
| 2012/0070665 A1 | 3/2012 | Bellomo et al. | | |
| 2013/0077338 A1* | 3/2013 | Wenzel | ................. | G02B 6/001 |
| | | | | 362/551 |
| 2015/0175790 A1* | 6/2015 | Kim | ........................ | C08L 51/06 |
| | | | | 524/451 |
| 2015/0368391 A1* | 12/2015 | Doneva | ................ | C08F 299/02 |
| | | | | 525/88 |

FOREIGN PATENT DOCUMENTS

| | | |
|---|---|---|
| CN | 105 623 090 A | 6/2016 |
| CN | 110643117 A | 1/2020 |
| CN | 110812518 | 2/2020 |
| CN | 111334922 | 6/2020 |
| CN | 111501368 | 8/2020 |
| CN | 111636147 | 9/2020 |
| JP | H01191454 | 8/1989 |
| JP | H09 52990 A | 2/1997 |
| JP | 2000204207 A | 7/2000 |
| JP | 2000301623 | 10/2000 |
| JP | 2001226542 A * | 8/2001 |
| JP | 2002256158 A | 9/2002 |
| JP | 2015162602 | 9/2015 |
| JP | 2017521576 | 8/2017 |
| JP | 2018154683 | 10/2018 |
| JP | 2019155292 | 9/2019 |
| WO | WO 2009072299 | 6/2009 |
| WO | WO 2022125868 | 6/2022 |

OTHER PUBLICATIONS

Lin, Y., et al., "Adhesion of olefin block copolymers to polypropylene and high density polyethylene and their effectiveness as compatibilizers in blends," Polymer 52, pp. 1635-1644 (Feb. 12, 2011).

European Search Report for application EP 21 20 4246 (Mar. 24, 2022).

Japanese Office Action regarding Application No. 2021-103785 (Sep. 2, 2022).

Japanese Patent Application No. 2021-175462, Notice of Reasons for Refusal issued by the Japanese Patent Office (Nov. 29, 2022).

First Office Action concerning Chinese Patent Application No. 2021112662949 (Jan. 19, 2024).

* cited by examiner

METHOD OF MAKING THERMOPLASTIC POLYOLEFIN

CROSS-REFERENCE TO RELATED APPLICATIONS

The present application is a divisional of U.S. patent application Ser. No. 17/082,706 filed on Oct. 28, 2020, which is incorporated by reference herein.

BACKGROUND AND SUMMARY

The present disclosure relates generally to polyolefin-based compositions for slush-molding shells, such as for automotive interior skins, that adhere to polyurethane-based foams during foam-in-place processes.

Traditionally, soft skins used in automotive interiors, such as for instrument panels, door uppers, consoles, and the like, are made using a slush-molding process. Many skins are back-foamed by a foam-in-place process, which is a process through which, for example, polyurethane foam is injected and/or formed between a skin and a hard substrate, resulting in desired haptics or a desired sense of touch and feel.

Slush molding involves heating a mold (typically a 3-4 mm thick nickel mold), pouring a polymeric powder or resin into the heated mold, and rotating the mold. While the mold is rotating, at least a portion of the powder melts and forms to an interior surface of the mold having a desired shape. After cooling and removal from the mold, a skin having the desired shape is formed. During this process, it is important that the powder or resin flows smoothly within the mold. Polyvinyl chloride (PVC) resin, for example, has an amorphous nature that exhibits good flowability for slush molding. In contrast, traditional thermoplastic olefin formulations have hooks and tails resulting from pulverization techniques that lead to an unacceptably poor flowability for slush molding, which in turn leads to higher scrap rates and inferior products.

Foam-in-place processing is used for automotive interiors to achieve desired haptics. Foam-in-place processing involves injecting an isocyanate and a polyol between an outer skin (e.g., made by slush molding) and a rigid support (e.g., a plastic support for an instrument panel) to form a polyurethane foam that bonds the skin and the rigid support together. The resulting product has very soft haptics, due at least in part to the polyurethane foam. The polar nature of PVC and thermoplastic polyurethane (TPU) makes them excellent skin candidates for achieving a desired adhesion between the skin and the polyurethane foam, whereas non-polar thermoplastic polyolefin (TPO) has poor adhesion and requires an additional surface treatment in order to adequately adhere to polyurethane foam. However, the effectiveness of surface treatments, such as flame treatment and plasma treatment, are limited by the design of the component being fabricated. Therefore, PVC and TPU are widely used in the automotive industry for slush-molded parts and soft skins, and TPO is not.

PVC is an excellent candidate for slush molding due to cost benefits and the reasons provided above. However, its performance depends on a plasticizer, which can deteriorate over time and at various temperatures, and develops a less than desired pliability at temperatures below about −30° C. TPU can overcome these issues, but is cost prohibitive for many automotive applications. Another common issue with PVC and TPU is that they both release volatile organic compounds (VOCs), which are regulated in many countries through legislation.

U.S. Pat. No. 6,812,285 describes a thermoplastic elastomer (TPE) composition for slush molding. The TPE composition is a polypropylene-hydrogenated block copolymer having (a) at least one polymer block A with a primary component that is a vinyl aromatic hydrocarbon monomer unit and (b) at least one polymer block B with a primary component that is a hydrogenated butadiene monomer unit.

U.S. Patent Publication No. 2012/0070665 describes a thermofusible TPE composition for slush molding. The formulation includes 40-70 wt. % of a selectively-hydrogenated styrenic block copolymer (HSBC), and 1-30 wt. % of a butylene homopolymer, a butylene copolymer, or a combination thereof. This formulation is cryogenically milled to obtain slush powder.

U.S. Pat. No. 8,674,027 describes a TPO elastomer composition in powder form, including an olefin-block copolymer (OBC), a linear ethylene polymer, and/or a linear ethylene polymer, and a propylene polymer blend for slush molding of skins, such as for interior applications, including instrument panels.

Despite references describing TPE or TPO for slush molding products, PVC and TPU continue to be used in many commercial applications in the automotive industry. Reasons for this continued use of PVC and TPU include (i) uneven flow behavior of TPE/TPO powders resulting from cryogenic or room temperature grinding, which yields slush molding products with uneven thicknesses and high scrap rates; (ii) poor adhesion of TPE/TPO with polyurethane foams with and without surface treatments, such as flame treatments, corona treatments, and plasma treatments; (iii) many TPE/TPO products do not meet aging requirements at 120° C.; (iv) scratch resistance is lost over time with TPE/TPO products; and (v) difficulty of airbag deployment through TPE/TPO panels without having large breaks (unacceptable failure mode).

Slush-molding grade TPO powder with excellent polyurethane adhesion, scuff and mar, low fog, UV resistance, subzero temperature performance, and acceptable airbag deployment is desired. TPO is considered for this purpose because of its low VOC output, lack of plasticizer content, and recyclability.

In various aspects of the current technology, a TPO composition is provided as TPO pellets or as a TPO powder (formed from the TPO pellets). The TPO pellets are configured to be processed into artificial leather skins or rolled films. The TPO powder is configured to be slush molded into a shaped TPO material having the benefits of PVC and TPU, but also having a low VOC output, good adhesion, long-term high heat performance, and reliable air bag deployment (for instrument panel applications).

The TPO composition includes an OBC, polypropylene copolymer, and a maleic anhydride-grafted OBC. In certain aspects, the OBC is ethylene-1-octene copolymer and the maleic anhydride-grafted OBC is ethylene-1-octene copolymer grafted with maleic anhydride. In some aspects, the TPO material also includes an antimicrobial agent, such as graphene and optionally a metal oxide.

The TPO powder has an angle of repose of greater than or equal to about 26° to less than or equal to about 34° and a bulk density of greater than or equal to about 18 lb/ft$^3$ to less than or equal to about 21 lb/ft$^3$. The TPO powder has spherical particles and is suitable for slush-molding processes for making a TPO material, such as, for example, automotive interior skins for doors and instrument panels having a thickness of greater than or equal to about 0.8 mm to less than or equal to about 1.4 mm. The TPO material directly bonds to open cell foams with an adhesion peel strength of greater than or equal to about 3 N/in without being subjected to secondary processing, such as flame treatments. Therefore, the TPO material is disposable over an open cell foam disposed on a rigid substrate so that a resulting article includes the open cell foam disposed between the TPO material and the rigid substrate, wherein the TPO bonds directly to the open cell foam.

In various other aspects of the current technology, a method of making the TPO powder includes combining an OBC, polypropylene, and an adhesion promoter to form a mixture; melt extruding the mixture to form an extruded material; pelletizing the extruded material to form TPO pellets; and grinding the TPO pellets to form the TPO powder. The TPO powder is slush-molding grade.

In various other aspects of the current technology, a method of fabricating an article includes introducing the TPO powder to an interior of a mold, wherein the mold has an interior surface having a predetermined shape; heating the mold to at least partially melt the TPO powder; during the heating, rotating the mold to coat the interior surface with the at least partially melted TPO powder; and cooling the mold to form a molded article having the predetermined shape. In some aspects, the article is an automotive vehicle component, such as an instrument panel, an A-pillar, a B-pillar, a C-pillar, a steering wheel skin, an airbag cover, a door trim panel, a door handle, a pillar handle, a roof handle, a center console, a knee bolster, a seat mechanism cover, or a sun visor.

Additional features and advantages can be ascertained from the following description and appended claims taken in conjunction with the accompanying drawings.

DETAILED DESCRIPTION

The TPO composition of the current technology is configured to prepare articles by slush molding, film casting, and thermoforming, such that the articles comprise a TPO material derived from the TPO composition. The TPO composition can be in the form of pellets or a powder. The articles are, for example, interior components of an automotive vehicle, such as an instrument panel, an A-pillar, a B-pillar, a C-pillar, a steering wheel skin, an airbag cover, a door trim panel, a door handle, a pillar handle, a roof handle, a center console, a knee bolster, a seat mechanism cover, a sun visor, and the like.

Figure 1:
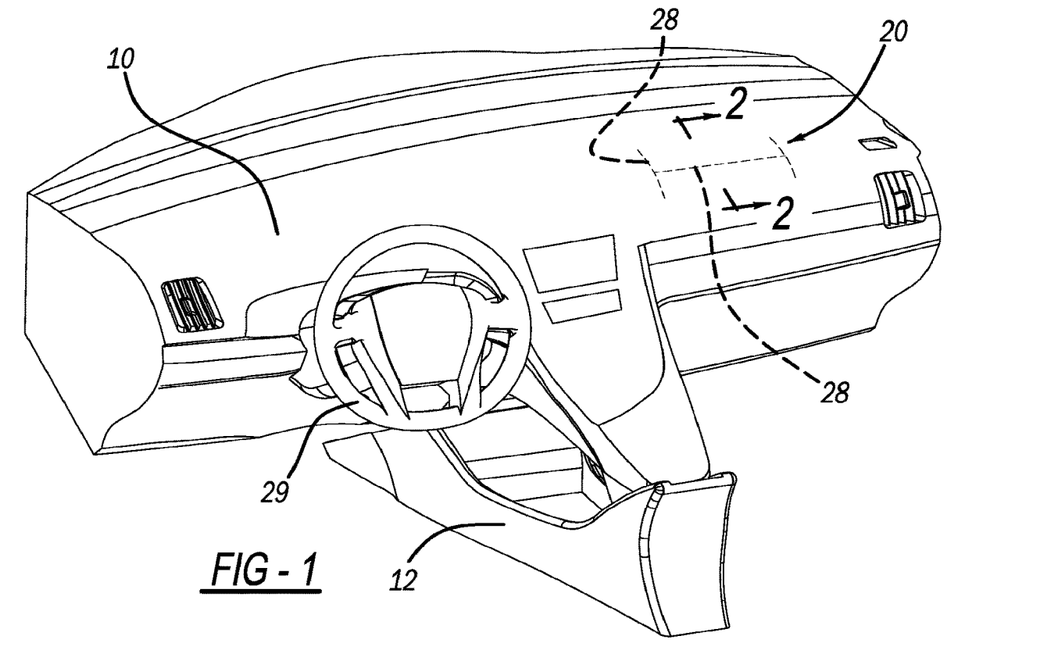
FIG. 1 is a perspective view showing an interior trim panel including a TPO material in accordance with various aspects of the current technology.
Figure 2:
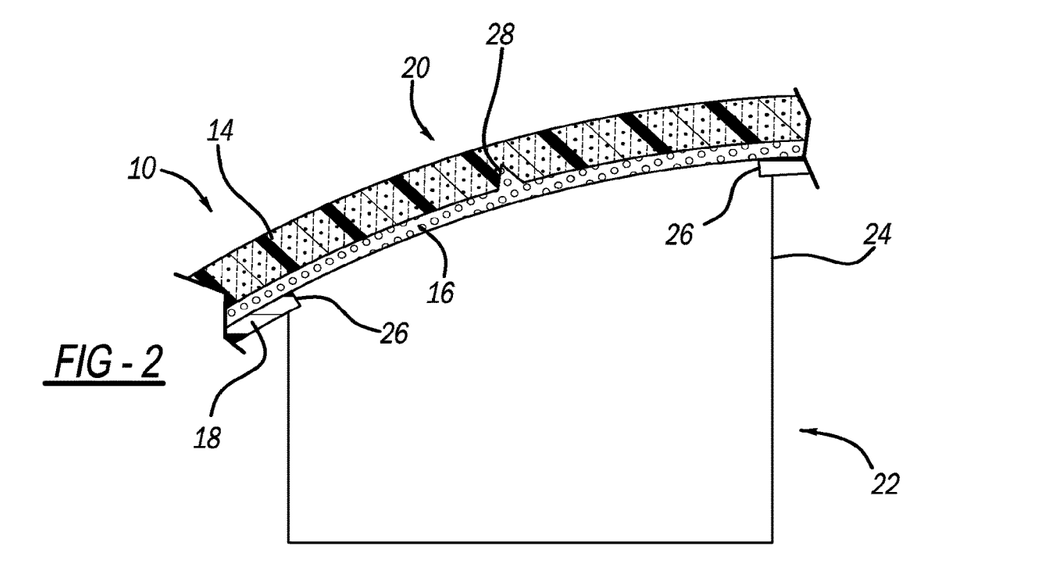
FIG. 2 is a cross-sectional view, taken along line 2-2 of FIG. 1, showing the interior trim panel.

An interior trim panel for a wheeled automotive land vehicle is shown in FIGS. 1 and 2. The interior trim panel is preferably an instrument panel 10, but may alternately include a center console 12, a separate airbag cover, a door trim panel, a knee bolster, a seat mechanism cover, a pillar cover, or the like. A steering wheel 29 is also shown in FIG. 1. The instrument panel 10 includes an outer skin 14, a middle pliable foam layer 16, and an inner rigid substrate 18. The steering wheel 29 may have the same general architecture as the instrument panel 10.

A section of the outer skin 14 acts as an integral airbag door 20, behind which is an airbag assembly 22 including a chute 24. The integral airbag door 20 hinges or pivots about upper and lower flexure lines adjacent generally horizontally elongated substrate edges 26 when an expanding airbag bursts tear seams 28 in the outer skin 14. As such, the tear seams 28 are frangible. A "seamless" or hidden style of the outer skin 14 is preferred, whereby the frangible tear seams 28 are on the backside surface thereof and are not visible to the vehicle occupant or user. The tear seams 28 preferably have an H-shape, although other configurations such as U-shapes and X-shapes can be employed.

The tear seams 28 can be created, for example, using a gantry-driven laser or an articulated robotically-driven knife, which horizontally slides along the backside surface of the outer skin 14 after it is formed in order to partially sever or score the outer skin 14. After scoring, the tear seam 28 material remaining is greater than or equal to about 0.3 mm to less than or equal to about mm, with an average of about 0.50 mm. Although a thinner tear seam is available, the score line will read through to the surface of the part if it is less than about 0.457 mm. Therefore, a depth of the scoring is more than half but less than all of the skin thickness. When exposed to heat at about 120° C. for about 1000 hours, the score line on the skin does not exhibit any heal back or rejoining. In other words, the TPO material of the current technology does not exhibit self-healing of the frangible tear seams 28 and helps to maintain the score line in a partially severed and separated wall fashion. Moreover, because the integral airbag door 20 having the frangible tear seams 28 comprises the TPO material, no skin fragmentation occurs from an airbag deployment at temperatures of about −30° C., about 23° C., about 80° C., or at about 120° C. Notwithstanding, all of the components described with reference to FIGS. 1 and 2 can be casted, thermoformed, or slush molded from the TPO composition.

The TPO composition, whether TPO pellets or particles of a TPO powder, includes an OBC at a concentration of greater than or equal to about wt. % to less than or equal to about 70 wt. % and polypropylene copolymer at a concentration of greater than or equal to about 10 wt. % to less than or equal to about 50 wt. % or greater than or equal to about 10 wt. % to less than or equal to about 20 wt. %, wherein the wt. % is based on the total weight of the particles. Unless described otherwise, it is understood that the "TPO composition" can be either the TPO pellets or TPO powder particles.

The OBC includes ethylene-1-octene copolymer having greater than or equal to about 50 wt. % to less than or equal to about 70 wt. % ethylene based on the total weight of the ethylene-1-octene copolymer. The ethylene-1-octene copolymer has a density of greater than or equal to about 0.887 g/cm 3 to less than or equal to about 0.95 g/cm 3 and a melt flow rate, as measured according to ASTM D-1238 (at 180° C. and 2.18 kg), of greater than or equal to about 5 g/10 min to less than or equal to about 20 g/10 min.

The polypropylene copolymer is highly crystalline with a low impact strength of greater than or equal to about 30 J/m to less than or equal to about 40 J/m, e.g., 35 J/m, and a high melt flow rate, as measured according to ASTM D-1238 (at 230° C. and 2.16 kg), of greater than or equal to about 75 g/10 min to less than or equal to about 125 g/10 min, such as an exemplary melt flow rate of about 100 g/10 min.

The TPO composition can also include an adhesion promoter, which may also be referred to as a compatibilizer, at a concentration of greater than or equal to about 1 wt. % to less than or equal to about 10 wt. %. The adhesion promoter is a maleic anhydride-grafted OBC, wherein the OBC can be the same OBC as what is combined with the polypropylene copolymer, as discussed above. For example, the powder can include ethylene-1-octene copolymer as the OBC and maleic anhydride-grafted ethylene-1-octene copolymer as the adhesion promoter. In some aspects, the adhesion promoter includes the maleic anhydride-grafted ethylene-1-octene copolymer at a concentration of greater than or equal to about 95 wt. % to less than or equal to about 98 wt. %, maleic anhydride at a concentration of greater than or equal to about 1 wt. % to less than or equal to about 3 wt. %, and N-ethylethylenediamine at a concentration of greater than or equal to about 1 wt. % to less than or equal to about 2 wt. %, wherein the wt. % is based on the total weight of the adhesion promoter.

The TPO composition can also include a stabilizer additive at a concentration of greater than or equal to about 0.1 wt. % to less than or equal to about 0.8 wt. %. The stabilizer additive can include sulfur or it can be substantially free or free of sulfur. By "substantially free of sulfur," it is meant that sulfur is not intentionally included in the stabilizer additive, but may be present as an impurity at a concentration of less than or equal to about 5 wt. % based on the total weight of the stabilizer additive. Non-limiting examples of the stabilizer additive include 2,2,6,6-tetramethylpiperidin-4-yl-hexadecanoate, 2,2,6,6-tetramethylpiperidin-4-yl-octadecanoate, and a combination thereof.

An adjunct composition component can also be included in the TPO composition at a concentration of greater than or equal to about 2 wt. % to less than or equal to about 6 wt. %. The adjunct composition includes at least a light stabilizer, at least one color pigment, or a combination thereof. The light stabilizer can be a visible light stabilizer and/or an ultraviolet (UV) light stabilizer and may be a non-migratory hindered amine light stabilizer (HALS). The light stabilizer and the at least one color pigment are provided in the adjunct composition at a concentration of greater than or equal to about 0.3 wt. % to less than or equal to about 3 wt. %.

The TPO composition can yet further include a density modifier at a concentration of greater than or equal to about 3 wt. % to less than or equal to about 10 wt. %. The density modifier can be a hydrous magnesium silicate mineral, such as talc, as a non-limiting example. The density modifier increases, and thus improves, the bulk density of the TPO powder. In certain aspects, the bulk density of the TPO powder is greater than or equal to about 18 lb/ft$^3$ to less than or equal to about 21 lb/ft$^3$.

The TPO composition can additionally include a scuff and mar resistance additive. The scuff and mar resistance additive improves the TPO composition's ability to resist scuffing, marring, and scratching. Scuff and mar resistance additives include amides, lubricants (including silicon oils), organic-modified siloxanes, and grafted polymers, as non-limiting examples. An exemplary and non-limiting scuff and mar resistance additive is NOF®-ALLOY KA832 scratch improver (NOF Corporation).

The particles of the TPO powder have substantially uniform shapes (e.g., substantially spherical) and sizes, the size of the particles being greater than or equal to about 50 µm to less than or equal to about 500 µm or greater or than or equal to about 100 µm to less than or equal to about 200 µm. Moreover, the particles have a narrow size distribution, in that greater than or equal to about 75%, greater than or equal to about 80% or greater than or equal to about 90% of the particles have a +/– size deviation of less than or equal to about 30 µm, less than or equal to about 20 µm, less than or equal to about 15 µm, or less than or equal to about 10 µm. The TPO powder is also characterized by an angle of repose of greater than or equal to about 26° to less than or equal to about 34°.

Figure 3:
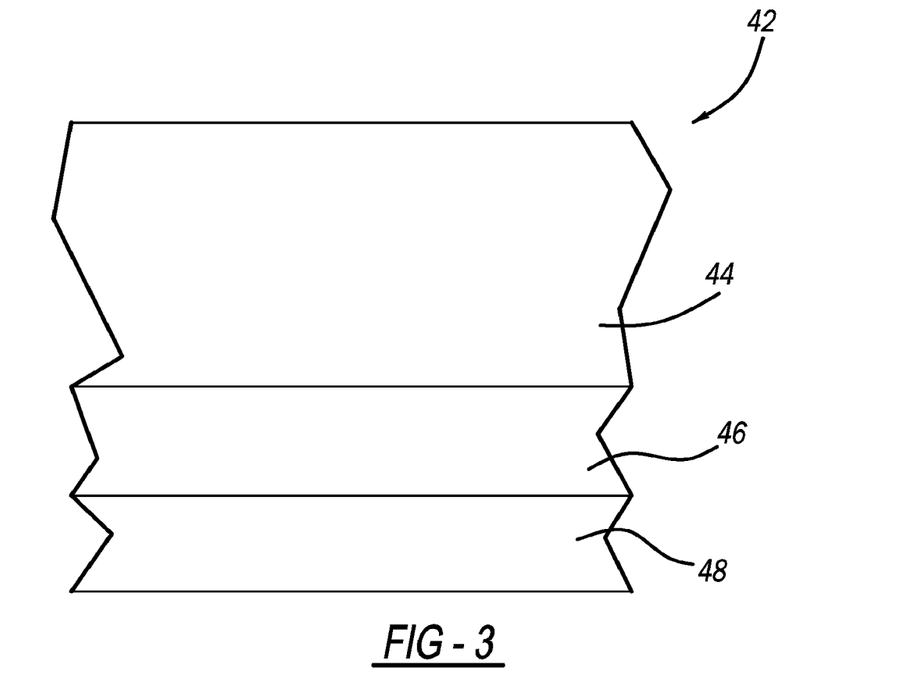
FIG. 3 is a perspective view showing an article including a TPO material in accordance with various aspects of the current technology.

With reference to FIG. 3, the TPO composition is configured to be slush molded (i.e., slush and rotary molded from the TPO powder), film casted, or thermoformed into an article 42, as discussed above. Thus, the article 42 comprises a TPO material 44 having a TPO matrix. As used herein, a "TPO matrix" is a bulk TPO polymer-based composition formed from the TPO composition. Depending on a predetermined application, the TPO material 44 can be flexible and soft, such as a synthetic leather or other flexible soft skin, or relatively rigid. The hardness, rigidness, and flexibility of the TPO material 44 is provided by the TPO matrix. Accordingly, the article 42 comprising the TPO material 44 comprises the components of the TPO, i.e., the OBC, the polypropylene copolymer, and the optional adhesion promoter, stabilizer additive, adjunct composition, and/or density modifier.

In some aspects, and as shown in FIG. 3, the article 42 comprising the TPO material 44 is a flexible soft skin. The flexible soft skin can be disposed over and about an open cell foam 46, such as a polyurethane foam, which is disposed between a rigid substrate 48 and the TPO material 44. Although an adhesive can be applied between the open cell foam 46 and the flexible soft skin, the TPO material 44 directly bonds to the open cell foam 46 with an adhesion peel strength of greater than or equal to about 3 N/in. As such, in some additional aspects, no adhesive is present to adhere the flexible soft skin to the open cell foam 46. When the flexible soft skin is subjected to heat aging at about 120° C. for about 500 hours, the flexible soft skin exhibits an elongation that does not change by more than about 30%, a tensile strength that does not change by more than about 30%, and, when the flexible skin has a frangible tear seam, a tear strength that does not change by more than about 30%.

In certain aspects, the TPO composition can additionally include an antimicrobial agent, such that a TPO material formed from the TPO composition is an antimicrobial TPO material. As used herein, the term "antimicrobial" provides that the antimicrobial TPO composition has antiviral properties, such that an antimicrobial TPO material formed from the antimicrobial TPO composition is an antiviral material, and in some aspects, also has antibacterial properties, i.e., the antimicrobial TPO material can be an antiviral and antibacterial TPO material, and/or antifungal properties, i.e., the antimicrobial TPO material can be an antiviral and antibacterial and/or antifungal TPO material. As such, when a virus contacts the antimicrobial TPO material, the virus is disabled, inactivated, destroyed, or "killed," such that the virus is no longer capable of infecting a subject. Similarly, when the antimicrobial TPO material has antibacterial properties, when a bacterium contacts the antimicrobial TPO material, the bacterium is killed. The term "antiviral" provides that the antiviral material disables, inactivates, destroys, or "kills" at least SARS-CoV-2, and in some aspects, also kills other viruses, including other coronaviruses. The antimicrobial TPO material has antiviral activity due to its ability, for example, to disrupt virus host cell recognition by denaturing protein structures on viral surfaces, leading to the inactivation of viruses irrespective of the presence of a viral envelope. The antimicrobial TPO material disables, inactivates, destroys, or "kills" greater than or equal to about 90%, greater than or equal to about 95%, greater than or equal to about 98%, or greater than or equal to about 99%, such as about 90%, about 91%, about 92%, about 93%, about 94%, about 95%, about 96%, about 97%, about 98%, about 99%, or about 99.9%, of SARS-CoV-2 viral particles or plaque forming units (PFUs) in less than or equal to about 4 hours, less than or equal to about 3 hours, less than or equal to about 2 hours, less than or equal to about 1 hours, less than or equal to about 45 minutes, less than or equal to about 30 minutes, or less than or equal to about 15 minutes.

Figure 4:
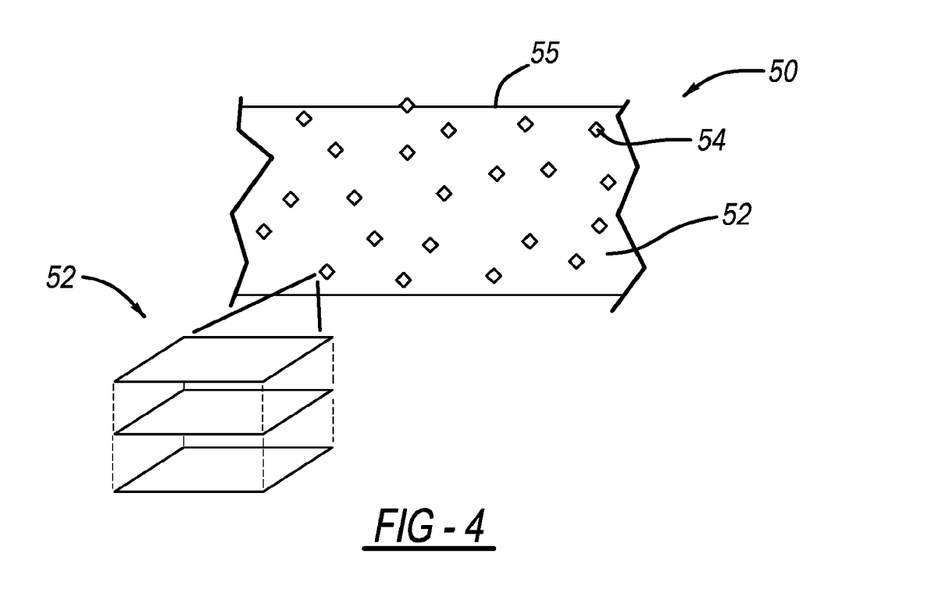
FIG. 4 is a perspective view showing a first antimicrobial TPO material in accordance with various aspects of the current technology.

Accordingly, with reference to FIG. 4, the current technology provides an antimicrobial TPO material 50 formed from the antimicrobial TPO composition. The antimicrobial TPO material 50 is the same as the TPO material 44 of FIG. 3, but further includes an antimicrobial agent. The antimicrobial TPO material 50 includes a TPO matrix 52 and graphene particles 54 disposed and/or embedded in the TPO matrix 52, including at an exposed surface 55. Accordingly, the TPO matrix 52 comprises a cured TPO polymer that embeds antimicrobial particles, such as the graphene particles 54. Depending on a predetermined application, the antimicrobial TPO material 50 can be flexible and soft or relatively rigid. The hardness, rigidness, and flexibility of the antimicrobial TPO material 50 is provided by the TPO matrix 52.

The graphene particles 54 are antimicrobial particles or flakes including graphene or a graphene derivative, such as graphene oxide, as a non-limiting example, that provide at least the antiviral activity. The graphene particles 54 have greater than or equal to 1 to less than or equal to 10 layers or greater than or equal to 6 to less than or equal to 10 layers, wherein each layer includes carbon atoms arranged in a two-dimensional honeycomb-shaped lattice. In various aspects, the graphene particles 54 have 1, 2, 3, 4, 5, 6, 7, 8, 9, or 10 of the layers. The graphene particles 54 have a diameter of greater than or equal to about 750 nm to less than or equal to about 250 µm, greater than or equal to about 1 µm to less than or equal to about 100 µm, or greater than or equal to about 1 µm to less than or equal to about 50 µm.

Without being bound by theory, the antimicrobial properties of graphene and graphene-derivatives (e.g., graphene oxide) may be attributed to the movement of their electrons towards microbes. This migration causes cytoplasmic efflux, decreases metabolism, affects lipid membrane, induces oxidative stress, produces reactive oxygen species (ROS), leads to loss of glutathione, and causes microbial death. As non-limiting examples, graphene can be used to kill different coronaviruses, including SARS-CoV strains.

Figure 5:
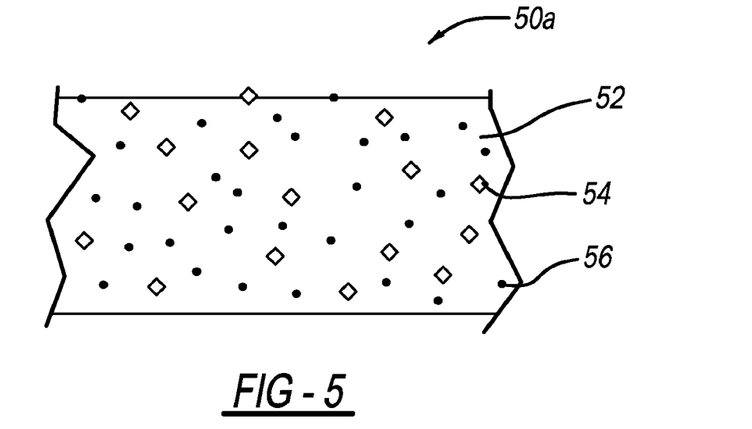
FIG. 5 is a perspective view showing a second antimicrobial TPO material in accordance with various aspects of the current technology.
Figure 6:
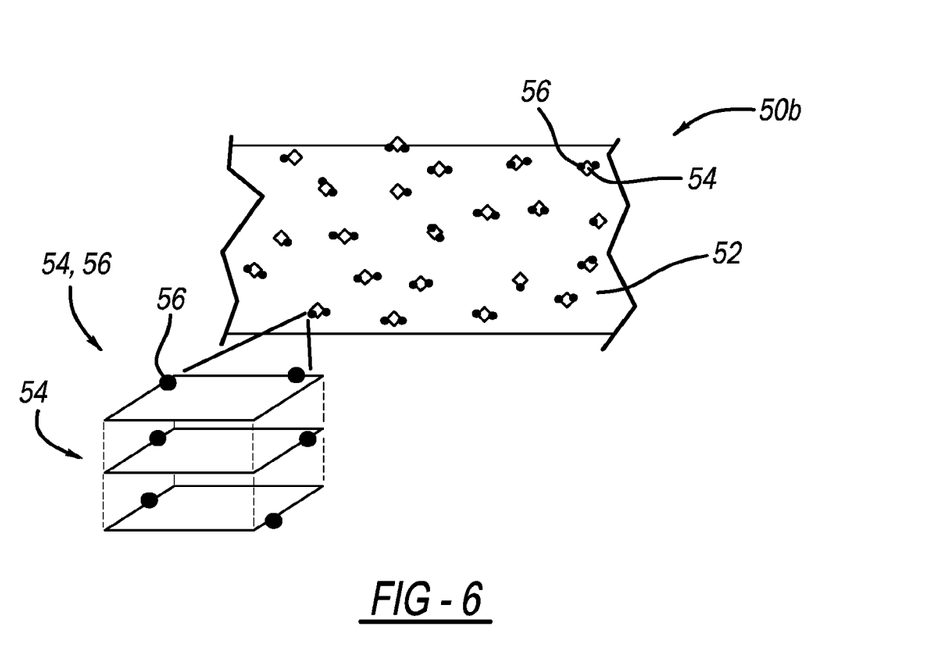
FIG. 6 is a perspective view showing a third antimicrobial TPO material in accordance with various aspects of the current technology.

In some aspects, the antimicrobial TPO material 50 includes an additional antimicrobial agent. FIGS. 5 and 6 show antimicrobial TPO materials 50b including the TPO matrix 52 and the graphene particles 54. The antimicrobial TPO materials 50a, 50b of FIGS. 5 and 6 further include metal oxide particles 56, wherein the metal oxide particles 56 also provide at least antiviral activity, as defined above in regard to the graphene particles 54. The metal oxide particles 56 include cuprous oxide ($Cu_2O$) particles, zinc oxide (ZnO) particles, silver oxide ($Ag_2O$), or combinations thereof. These metal oxide particles 56 release antimicrobial ions, such as $Cu^{1+}$, $Ag^{1+}$, and/or $Zn^{2+}$, and are used to prepare antimicrobial surfaces. Graphene and/or graphene oxide can promote antimicrobial activities of these ions further and improve the effectiveness. The metal oxide particles 56 have a diameter of greater than or equal to about 100 nm to less than or equal to about 100 µm, greater than or equal to about 200 nm to less than or equal to about 10 µm, greater than or equal to about 250 nm to less than or equal to about 5 µm, or greater than or equal to about 250 nm to less than or equal to about 1.8 µm.

As shown in FIG. 5, the graphene particles 54 and the metal oxide particles 56 are individually uniformly dispersed throughout the TPO matrix 52 in the antimicrobial TPO material 50a. By "individually uniformly dispersed," it is meant that the graphene particles 54 and the metal oxide particles 56 are blended within the TPO matrix 52 without respect to each other. Inasmuch as some of the graphene particles 54 and the metal oxide particles 56 may be in contact with each other, the contact is random and an artifact of a mixing step of a method of fabricating the antimicrobial TPO material 50a, as discussed below. Therefore, contact between a portion of the graphene particles 54 and a portion of the metal oxide particles 56 is not intended, but may be present.

As shown in FIG. 6, the graphene particles 54 and the metal oxide particles 56 are present as graphene-metal oxide particle complexes 54, 56 that are uniformly dispersed throughout the TPO matrix 52 in the antimicrobial TPO material 50b. As such, the graphene particles 54 carry the metal oxide particles 56 in the graphene-metal oxide particle complexes 54, 56. Nonetheless, it is understood that there may be some, i.e., a minority portion, of the graphene particles 54 and/or the metal oxide particles 56 that are present in the TPO matrix 52 individually, and not in a graphene-metal oxide particle complex 54, 56. As discussed below, the graphene-metal oxide particle complexes 54, 56 are formed prior to blending with the polymer that defines the TPO matrix 52 during a fabrication process.

In all of the descriptions of the current technology provided herein, the antimicrobial TPO material 50 can alternatively be either the antimicrobial TPO material 50a of FIG. 5 or the antimicrobial TPO material 50b of FIG. 6, unless otherwise stated.

The antimicrobial TPO material 50 of FIG. 4 includes the TPO matrix 52 having polymeric components, i.e., the OBC, the polypropylene copolymer, and the adhesion promoter (when present), at a concentration of greater than or equal to about 50 wt. % to less than or equal to about 99 wt. %. The graphene particles 54 have a concentration in the antimicrobial TPO material 50 of greater than or equal to about 0.05 wt. % to less than or equal to about 10 wt. %, greater than or equal to about 0.1 wt. % to less than or equal to about 5 wt. %, or greater than or equal to about 0.25 wt. % to less than or equal to about 1 wt. %, including at concentrations of about 0.05 wt. %, about 0.1 wt. %, about 0.15 wt. %, about 0.2 wt. %, about 0.25 wt. %, about 0.3 wt. %, about 0.35 wt. %, about 0.4 wt. %, about 0.45 wt. %, about 0.5 wt. %, about 0.55 wt. %, about 0.6 wt. %, about 0.65 wt. %, about 0.7 wt. %, about 0.75 wt. %, about 0.8 wt. %, about 0.85 wt. %, about 0.9 wt. %, about 0.95 wt. %, about 1 wt. %, about 1.5 wt. %, about 2 wt. %, about 2.5 wt. %, about 3 wt. %, about 3.5 wt. %, about 4 wt. %, about 4.5 wt. %, about 5 wt. %, about wt. %, about 6 wt. %, about 6.5 wt. %, about 7 wt. %, about 7.5 wt. %, about 8 wt. %, about 8.5 wt. %, about 9 wt. %, about 9.5 wt. %, or about 10 wt. %. The TPO matrix 52 also includes the stabilizer additive, adjunct composition, and/or density modifier when present with the TPO composition.

The antimicrobial TPO materials 50a, 50b of FIGS. 5 and 6 have the same composition as the antimicrobial TPO material 50, but further comprise greater than 0 wt. % to less than or equal to about 20 wt. % of the metal oxide particles 56. When the metal oxide particles 56 include more than one type of metal oxide, such as at least one of $Cu_2O$ or ZnO, the $Cu_2O$ or ZnO are present at concentrations of greater than or equal to 0 wt. % to less than or equal to about wt. % of the metal oxide particles 56, individually, with the proviso that at least one of the $Cu_2O$ particles or the ZnO particles are present in the antimicrobial TPO materials 50a, 50b. Therefore, the antimicrobial TPO materials 50a, 50b include greater than 0 wt. % to less than or equal to about 20 wt. % of at least one of the $Cu_2O$ particles or the ZnO particles. The wt. % is based on the total weight of the antimicrobial TPO materials 50a, 50b.

Figure 7:
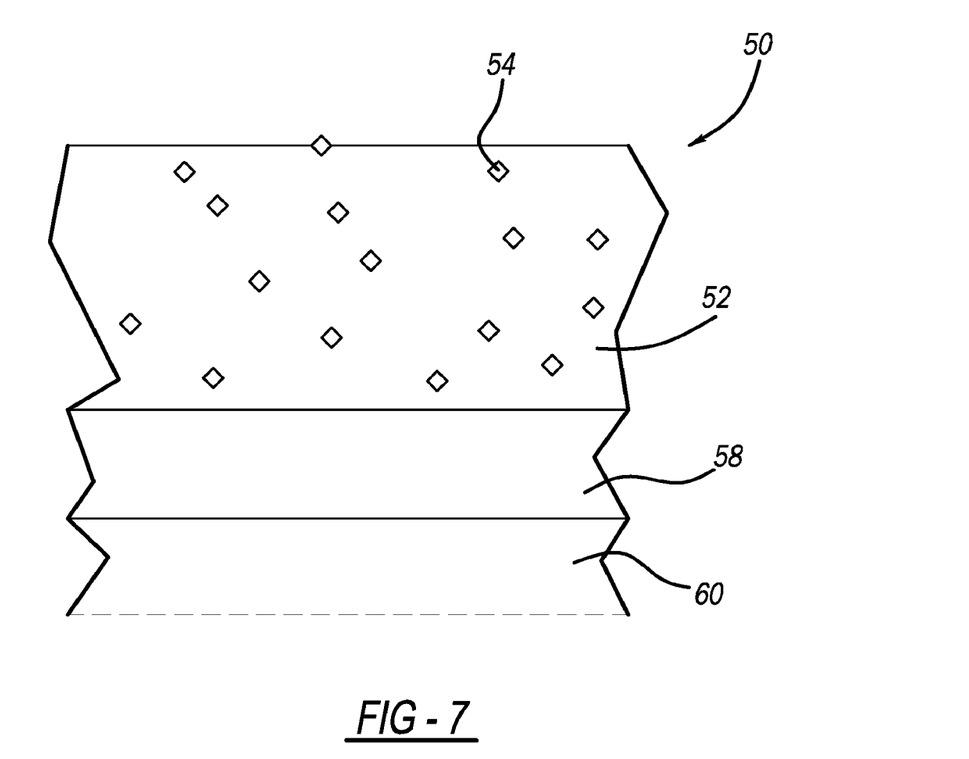
FIG. 7 is a perspective view showing an antimicrobial TPO material disposed on at least one sublayer in accordance with various aspects of the current technology.

With reference to FIG. 7, in some aspects the antimicrobial TPO material 50 is disposed over, about, and directly on a first sublayer or substrate 58. The first sublayer or substrate 58 can be a compressible foam, especially when the antimicrobial TPO material 50 is soft and flexible, or a rigid substrate, especially when the antimicrobial TPO material 50 is rigid. Moreover, the first sublayer or substrate 58 can be disposed on a second sublayer or substrate 60. For example, in various aspects, the antimicrobial TPO material 50 is a soft flexible material, such as a synthetic leather, that is disposed over a compressible foam first sublayer or substrate 58, which itself is disposed on a rigid second sublayer or substrate 60.

The antimicrobial TPO materials 50, 50a, 50b described herein may include at least the components described herein. However, it is understood that the antimicrobial TPO materials 50, 50a, 50b may alternatively be limited to the components described herein or to a portion of the components described herein. For example, the antimicrobial TPO material 50 can include an antimicrobial agent comprising, consisting essentially of, or consisting of graphene. By "consisting essentially of," it is meant that the antimicrobial TPO material 50 only intentionally includes graphene as the antimicrobial agent and is substantially free of any other antimicrobial agents. By "substantially free," it is meant that additional antimicrobial agents may be included in trace amounts, i.e., less than or equal to about 5 wt. % or less than or equal to about 1 wt. %, as impurities, wherein the trace amounts do not affect the antimicrobial activity provided by the graphene. Similarly, the antimicrobial TPO materials 50a, 50b can include antimicrobial agents comprising, consisting essentially of, or consisting of graphene and at least one of $Cu_2O$, ZnO, or $Ag_2O$.

Figure 8:
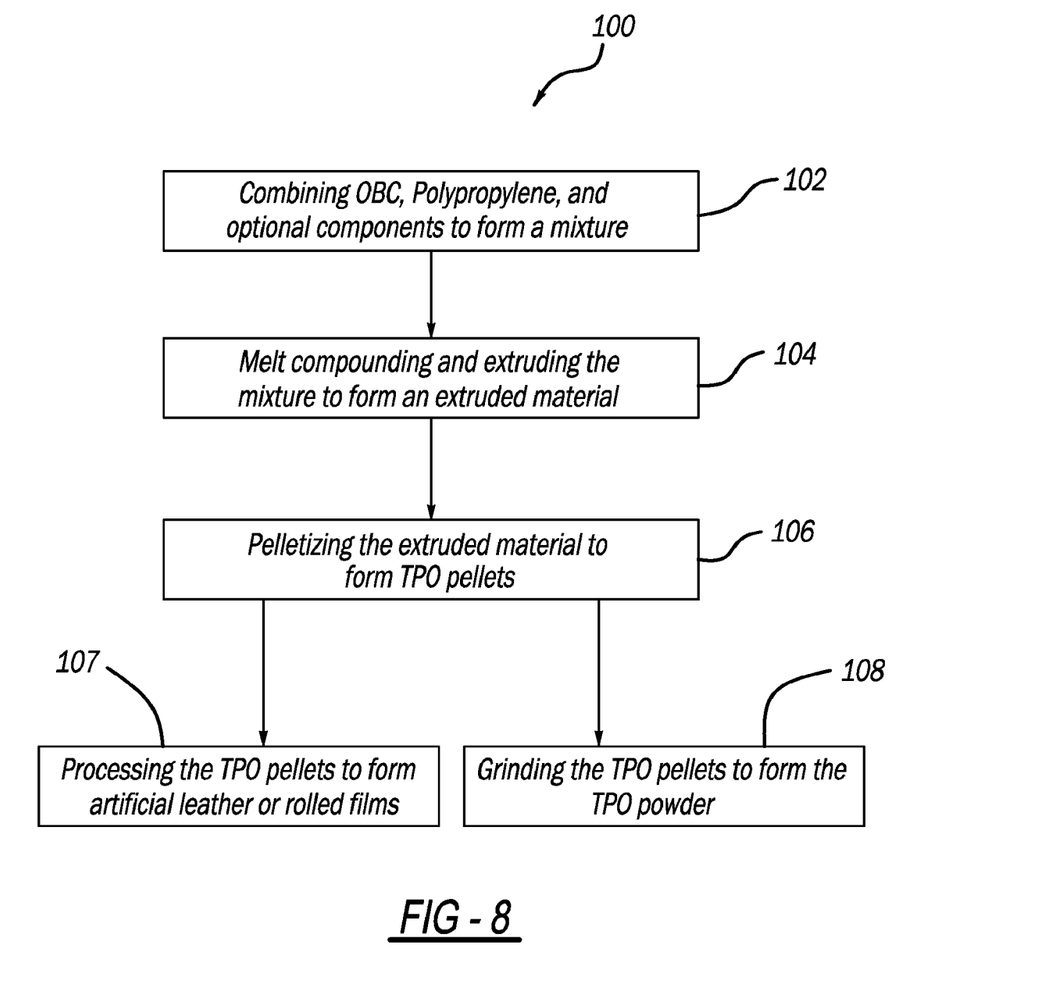
FIG. 8 is a diagrammatic flow chart showing a method for making a TPO powder in accordance with various aspects of the current technology.

With reference to FIG. 8, the current technology also provides a method 100 of making the TPO composition, including TPO pellets and TPO powder, the TPO powder being slush-molding grade. The TPO pellets have a diameter of greater than or equal to about 1 mm to less than or equal to about mm or greater than or equal to about 1 mm to less than or equal to about 6 mm. At block 102, the method 100 includes combining and mixing together the OBC, polypropylene, and optional adhesion promoter, stabilizer additive, adjunct composition, density modifier, and/or antimicrobial agent to form a mixture. Then, in block 104, the method 100 includes melt compounding and extruding the mixture to form an extruded material. The melt compounding and extruding is performed, for example, with a twin-screw extruder. The extruded material can be a solid, unitary thread or it can have a hollow interior, such as a cylinder or pipe. Optional components can be added to the mixture during the melt compounding and extruding. The optional components include the density modifier (for modifying and improving the resulting TPO composition's bulk density), the stabilizer, the pigment (or colorant), the scuff and mar resistance additive (e.g., 20 g/10 min of NOF®-ALLOY KA832 scratch improver), or combinations thereof. The stabilizer and pigment can be provided in a single adjunct composition, as discussed above.

Next, in block 106, the method 100 includes pelletizing the extruded material to form TPO pellets. The pelletizing is performed by cutting or grinding the extruded material into the TPO pellets.

As shown in block 107, the method 100 includes processing the TPO pellets to form artificial leather or rolled films. The processing includes cast film processing or calendaring. For example, the TPO pellets can be fed into a calendaring/cast film extruder to obtain rolled films. The artificial leather or rolled films are processable by cutting and sewing and/or by thermoforming.

In block 108, the method includes grinding the TPO pellets to form the TPO powder. The grinding can include, for example, hydrogrinding, i.e., pulverizing under water, to achieve a desired particle shape and size distribution, such that the particles pass through a sieve having openings that are less than or equal to about 500 μm. A density modifier can be added to the TPO powder to modify and improve the TPO powder's bulk density.

Figure 9:
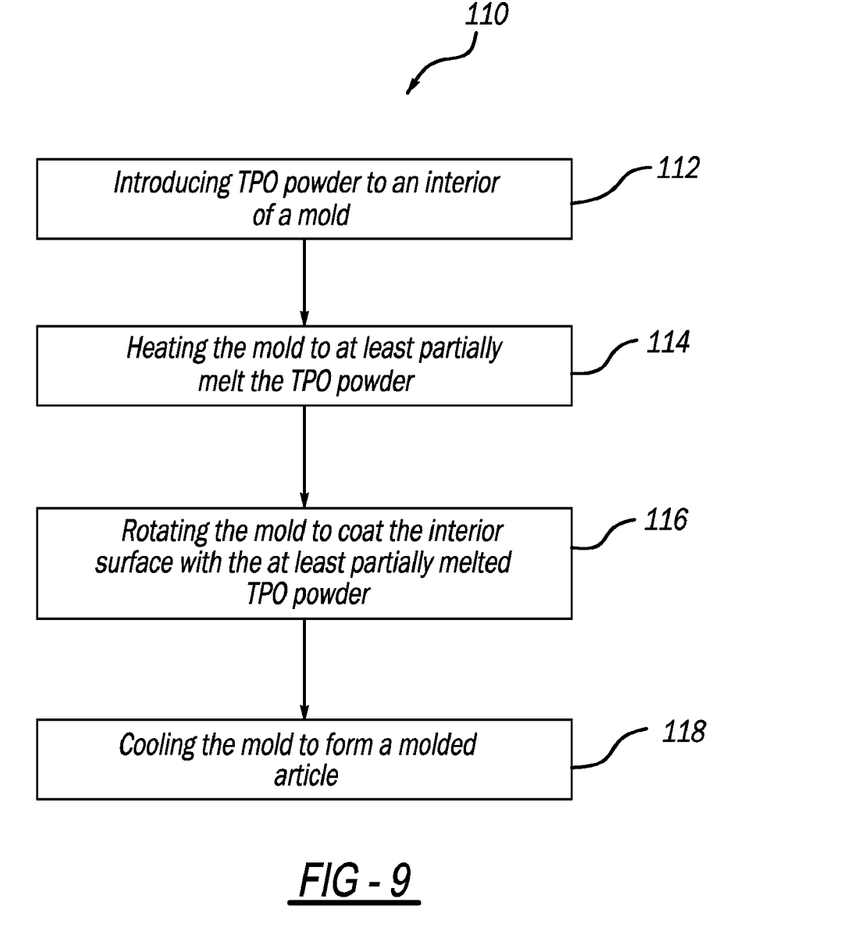
FIG. 9 is a diagrammatic flow chart showing a method for fabricating an article composed of a TPO material in accordance with various aspects of the current technology.

With reference to FIG. 9, the current technology also provides a method 110 of fabricating an article from the TPO powder. At block 112, the method 110 includes introducing the TPO powder to an interior of a mold, wherein the mold has an interior surface having a predetermined shape. Next, in block 114, the method 110 includes heating the mold to at least partially melt the TPO powder. In block 116, the method 110 includes, during the heating, rotating the mold to coat the interior surface with the at least partially melted TPO powder. As shown in block 118, the method 110 then includes cooling the mold to form the molded article having the predetermined shape.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making a thermoplastic polyolefin (TPO) composition, the method comprising:
   (a) mixing together an olefin-block copolymer (OBC), polypropylene, an adhesion promoter and stabilizers, to form a mixture;
   wherein the olefin-block copolymer is at a concentration of greater than or equal to about 50 wt. % to less than or equal to about 70 wt. %;

wherein the polypropylene is at a concentration of greater than or equal to about 10 wt. % to less than or equal to about 20 wt. %;
wherein the adhesion promoter at a concentration of greater than or equal to about 1 wt. % to less than or equal to about 10 wt. %;
wherein the stabilizers comprise a sulfur-free stabilizer additive at a concentration of greater than or equal to about 0.1 wt. % to less than or equal to about 0.8 wt. %;
wherein the stabilizers comprise non-migratory hindered amine light stabilizers (HALS) and a color pigment at a concentration of greater than or equal to about 2 wt. % to less than or equal to about 6 wt. %;
(b) melt extruding the mixture to form an extruded material;
(c) pelletizing the extruded material to form TPO pellets;
(d) forming artificial leather or rolled film from the TPO pellets; and
(e) directly bonding an open cell polyurethane foam to the artificial leather or rolled film.

2. The method according to claim 1, wherein:
the OBC comprises ethylene-1-octene copolymer comprising greater than or equal to about 50 wt. % to less than or equal to about 70 wt. % ethylene based on the total weight of the ethylene-1-octene copolymer and having a density of greater than or equal to about 0.887 g/cm$^3$ to less than or equal to about 0.95 g/cm$^3$;
the ethylene-1-octene copolymer has a melt flow rate of greater than or equal to about 5 g/10 min to less than or equal to about 20 g/10 min as measured according to ASTM D-1238 using 2.18 kg of the ethylene-1-octene copolymer and a temperature of about 180° C.; and
the polypropylene copolymer is crystalline, has a low impact strength of greater than or equal to about 30 J/m to less than or equal to about 40 J/m, and has a melt flow rate of about 100 g/10 min as measured according to ASTM D-1238 using 2.16 kg of the polypropylene copolymer and a temperature of about 230° C.

3. The method according to claim 1, wherein the adhesion promoter comprises:
maleic anhydride-grafted ethylene-1-octene copolymer at a concentration of greater than or equal to about 95 wt. % to less than or equal to about 98 wt. %;
maleic anhydride at a concentration of greater than or equal to about 1 wt. % to less than or equal to about 3 wt. %; and
N-ethylethylenediamine at a concentration of greater than or equal to about 1 wt. % to less than or equal to about 2 wt. %,
wherein the wt. % is based on the total weight of the adhesion promoter.

4. The method according to claim 1, further comprising:
grinding the TPO pellets into a TPO powder comprising particles having a particle size of greater than or equal to about 100 µm to less than or equal to about 200 µm;
wherein the TPO powder has an angle of repose of greater than or equal to about 26° to less than or equal to about 34°; and
wherein the TPO powder has a bulk density of greater than or equal to about 18 lb/ft$^3$ to less than or equal to about 21 lb/ft$^3$.

5. The method according to claim 1, wherein the open cell polyurethane foam is directly bonded to the artificial leather or rolled film with an adhesion peel strength of greater than or equal to about 3 N/in.

6. The method according to claim 1, further comprising hydrogrinding the TPO pellets to create TPO powder.

7. The method according to claim 1, further comprising cutting and sewing the artificial leather or rolled film, and thereafter attaching the artificial leather or rolled film to a rigid substrate configured for attachment to an interior of an automotive vehicle.

8. The method according to claim 1, further comprising creating an automotive vehicle: A-pillar, B-pillar, C-pillar, steering wheel skin, airbag cover, door trim panel, door handle, pillar handle, roof handle, center console, knee bolster, seat mechanism cover, or sun visor from the artificial leather or rolled film, with the open cell polyurethane foam being disposed between a substrate and the artificial leather or rolled film.

9. A method of making a thermoplastic polyolefin (TPO) composition, the method comprising:
(a) mixing together an olefin-block copolymer (OBC), polypropylene, an adhesion promoter and stabilizers, to form a mixture;
wherein the olefin-block copolymer is at a concentration of greater than or equal to about 50 wt. % to less than or equal to about 70 wt. %;
wherein the polypropylene is at a concentration of greater than or equal to about 10 wt. % to less than or equal to about 20 wt. %;
wherein the adhesion promoter at a concentration of greater than or equal to about 1 wt. % to less than or equal to about 10 wt. %;
wherein the stabilizers comprise a sulfur-free stabilizer additive at a concentration of greater than or equal to about 0.1 wt. % to less than or equal to about 0.8 wt. %;
wherein the stabilizers comprise non-migratory hindered amine light stabilizers (HALS) and a color pigment at a concentration of greater than or equal to about 2 wt. % to less than or equal to about 6 wt. %;
(b) melt extruding the mixture to form an extruded material;
(c) pelletizing the extruded material to form TPO pellets; and
(d) hydrogrinding the TPO pellets to create TPO powder.

10. The method according to claim 9, wherein:
the OBC comprises ethylene-1-octene copolymer comprising greater than or equal to about 50 wt. % to less than or equal to about 70 wt. % ethylene based on the total weight of the ethylene-1-octene copolymer and having a density of greater than or equal to about 0.887 g/cm$^3$ to less than or equal to about 0.95 g/cm$^3$;
the ethylene-1-octene copolymer has a melt flow rate of greater than or equal to about 5 g/10 min to less than or equal to about 20 g/10 min as measured according to ASTM D-1238 using 2.18 kg of the ethylene-1-octene copolymer and a temperature of about 180° C.; and
the polypropylene copolymer is crystalline, has a low impact strength of greater than or equal to about 30 J/m to less than or equal to about 40 J/m, and has a melt flow rate of about 100 g/10 min as measured according to ASTM D-1238 using 2.16 kg of the polypropylene copolymer and a temperature of about 230° C.

11. The method according to claim 9, wherein the adhesion promoter comprises:
maleic anhydride-grafted ethylene-1-octene copolymer at a concentration of greater than or equal to about 95 wt. % to less than or equal to about 98 wt. %;

maleic anhydride at a concentration of greater than or equal to about 1 wt. % to less than or equal to about 3 wt. %; and N-ethylethylenediamine at a concentration of greater than or equal to about 1 wt. % to less than or equal to about 2 wt. %, wherein the wt. % is based on the total weight of the adhesion promoter.

12. The method according to claim 9, wherein the TPO powder comprises particles having a particle size of greater than or equal to about 100 μm to less than or equal to about 200 μm;

wherein the TPO powder has an angle of repose of greater than or equal to about 26° to less than or equal to about 34°; and wherein the TPO powder has a bulk density of greater than or equal to about 18 lb/ft$^3$ to less than or equal to about 21 lb/ft$^3$.

13. The method according to claim 9, further comprising rotational molding the TPO powder to form a flexible skin, and thereafter attaching the skin to a rigid substrate configured for attachment to an interior of an automotive vehicle.

14. The method according to claim 9, further comprising creating an automotive vehicle: A-pillar, B-pillar, C-pillar, steering wheel skin, airbag cover, door trim panel, door handle, pillar handle, roof handle, center console, knee bolster, seat mechanism cover, or sun visor from a flexible skin formed from melting the TPO powder, with foam between a substrate and the skin.

15. A method of making a thermoplastic polyolefin (TPO) composition, the method comprising:

mixing together an olefin-block copolymer (OBC), polypropylene, and an adhesion promoter to form a mixture;

melt extruding the mixture to form an extruded material;

pelletizing the extruded material to form TPO pellets; and grinding the TPO pellets in water to form a TPO powder.

16. The method according to claim 15, wherein the adhesion promoter comprises a maleic anhydride-grafted OBC.

17. The method according to claim 15, wherein the adhesion promoter comprises maleic anhydride-grafted ethylene-1-octene copolymer.

18. The method according to claim 15, wherein the OBC comprises ethylene-1-octene copolymer.

19. The method according to claim 15, further comprising:

adding a density modifier to the powder for improving the powder's bulk density.

20. The method according to claim 15, further comprising:

adding at least one of a stabilizer, a colorant, a scuff and mar resistance additive, or a density modifier to the mixture during the melt extruding.

21. The method according to claim 15, wherein the TPO powder is slush-molding grade.

22. The method according to claim 15, further comprising melting and rotational molding the TPO powder to form a flexible skin inside a mold.

23. The method according to claim 15, further comprising creating an automotive vehicle: A-pillar, B-pillar, C-pillar, steering wheel skin, airbag cover, door trim panel, door handle, pillar handle, roof handle, center console, knee bolster, seat mechanism cover, or sun visor from a flexible skin formed from melting the TPO powder, with foam between a substrate and the skin.

24. The method according to claim 15, wherein the TPO pellets are configured for melting and creating a flexible skin with a frangible tear seam partially severed on a back surface thereof, without self-healing.

25. The method according to claim 15, further comprising adding a scuff and mar resistance additive to the mixture, the scuff and mar resistance additive comprising at least one of: an amide, silicon oil or siloxane.

26. The method according to claim 22, further comprising:

attaching the skin to a rigid substrate configured for attachment to an interior of an automotive vehicle.

27. The method according to claim 22, further comprising:

bonding the skin to an open cell foam comprising polyurethane.

28. The method according to claim 15, wherein the OBC comprises ethylene-1-octene copolymer;

the ethylene-1-octene copolymer is at a concentration of greater than 50 wt. % and less than or equal to about 70 wt. % based on the total weight of the mixture;

the polypropylene is at a concentration of greater than or equal to about 10 wt. % and less than or equal to 20 wt. % based on the total weight of the mixture;

the adhesion promoter comprises maleic anhydride-grafted ethylene-1-octene copolymer; and the adhesion promoter is at a concentration of greater than or equal to about 1 wt. % to less than or equal to about 10 wt. % based on the total weight of the mixture.

* * * * *